US011844000B2

(12) United States Patent
Kurniawan (10) Patent No.: US 11,844,000 B2
(45) Date of Patent: Dec. 12, 2023

(54) INFORMATION PROCESSING SYSTEM, INFORMATION PROCESSING METHOD, MOBILE DEVICE, AND COMPUTER-READABLE RECORDING MEDIUM

(71) Applicant: YOKOGAWA ELECTRIC CORPORATION, Musashino (JP)

(72) Inventor: Jason Kurniawan, Tokyo (JP)

(73) Assignee: YOKOGAWA ELECTRIC CORPORATION, Musashino (JP)

( * ) Notice: Subject to any disclaimer, the term of this patent is extended or adjusted under 35 U.S.C. 154(b) by 0 days.

(21) Appl. No.: 17/678,879

(22) Filed: Feb. 23, 2022

(65) Prior Publication Data

US 2022/0295244 A1 Sep. 15, 2022

(30) Foreign Application Priority Data

Mar. 10, 2021 (JP) .................................. 2021-038467

(51) Int. Cl.
*H04W 4/80* (2018.01)
*H04W 4/30* (2018.01)

(52) U.S. Cl.
CPC ............... *H04W 4/30* (2018.02); *H04W 4/80* (2018.02)

(58) Field of Classification Search
CPC .................................. H04W 4/80; H04W 4/30
See application file for complete search history.

(56) References Cited

U.S. PATENT DOCUMENTS

| 9,923,993 | B2 * | 3/2018 | Pantea ...................... G06F 8/38 |
| 2009/0077055 | A1 * | 3/2009 | Dillon ................ G05B 23/0272 |
| | | | 707/999.005 |
| 2010/0290351 | A1 | 11/2010 | Toepke et al. |
| 2018/0107178 | A1 | 4/2018 | Nixon et al. |
| 2019/0052638 | A1 | 2/2019 | Agarwal et al. |

FOREIGN PATENT DOCUMENTS

| EP | 3163431 A1 | 5/2017 |
| EP | 3444684 A1 | 2/2019 |
| GB | 2452635 A | 3/2009 |
| JP | 2004-349804 A | 12/2004 |
| JP | 2005-018142 A | 1/2005 |
| JP | 2010-539596 A | 12/2010 |

OTHER PUBLICATIONS

Extended European Search Report dated Jul. 20, 2022, issued in counterpart EP application No. 22157994.9. (11 pages).
Office Action dated Mar. 7, 2023, issued in counterpart JP Application No. 2021-038467 with English machine translation (4 pages).

* cited by examiner

*Primary Examiner* — Tuan H Nguyen
(74) *Attorney, Agent, or Firm* — WHDA, LLP (57) ABSTRACT

An information processing system includes a number of field devices provided in a plant and a mobile device that acquires data from the field devices. The mobile device includes a data management unit that manages the field devices that are grouped for each plant area and a processing unit that acquires data using wireless communication from, out of the field devices managed by the data management unit, the field devices provided in the plant area selected by user operation.

14 Claims, 9 Drawing Sheets

IMAGE OF PLANT AREA 311a

FIG.6

| PLANT AREA | FIELD DEVICE |
|---|---|
| PLANT AREA 311a | FIELD DEVICE #1 |
| | FIELD DEVICE #2 |
| | ... |
| | FIELD DEVICE #N |
| PLANT AREA 311b | ... |
| PLANT AREA 311c | ... |

INFORMATION PROCESSING SYSTEM, INFORMATION PROCESSING METHOD, MOBILE DEVICE, AND COMPUTER-READABLE RECORDING MEDIUM

CROSS-REFERENCE TO RELATED APPLICATION

The present application claims priority to and incorporates by reference the entire contents of Japanese Patent Application No. 2021-038467 filed in Japan on Mar. 10, 2021.

FIELD

The present invention relates to an information processing system, an information processing method, a mobile device, and a computer-readable recording medium.

BACKGROUND

For the purpose of maintenance and such of field devices provided in a plant or the like, acquiring data from the field devices has been known (see U.S. Patent Application Publication No. 2019/0052638, for example.)

Until now, an operator has approached the field device to be a subject of data acquisition and acquired data using a dedicated tool. However, data acquisition is often difficult as a large number of field devices are provided in a plant or as the field devices are located in places difficult to approach in the plant, for example.

An object of the present invention is to acquire data of the field devices efficiently.

SUMMARY

According to one aspect of embodiments, an information processing system comprises a number of field devices provided in a plant; and a mobile device configured to acquire data from the field devices, wherein the mobile device includes a data management unit configured to manage the field devices that are grouped for each plant area, and a processing unit configured to acquire data using wireless communication from, out of the field devices managed by the data management unit, the field device provided in the plant area selected by user operation.

According to one aspect of embodiments, an information processing method comprises managing, by a mobile device, a number of field devices that are grouped for each plant area; and acquiring, by the mobile device, data using wireless communication from, out of the field devices managed, the field device provided in the plant area selected by user operation.

According to one aspect of embodiments, a mobile device comprises a data management unit configured to manage a number of field devices that are grouped for each plant area; and a processing unit configured to acquire data using wireless communication from, out of the field devices managed by the data management unit, the field device provided in the plant area selected by user operation.

According to one aspect of embodiments, a computer-readable recording medium stores therein an information processing program that causes a computer to perform a process comprising: managing a number of field devices that are grouped for each plant area; and acquiring data using wireless communication from, out of the field devices managed, the field device provided in the plant area selected by user operation.

DESCRIPTION OF EMBODIMENTS

Introduction

In industrial plants such as petroleum, chemicals, pharmaceuticals, and pulp (hereinafter simply referred to as "plants"), field devices such as transmitters (for example, transmitters for pressure, temperature, fluid level, and the like), flow meters, analyzers, and actuators are used. The field devices need regular maintenance. Examples of maintenance work include verifying if the field device is functioning properly, whether the process values measured by the field device are normal, or the like, and it is carried out by acquiring data from the field device.

Depending on the size of the plant, the number of field devices constituting the process control, measurement system network, and the like extends to several tens and hundreds, and further to more than several thousands. The regular maintenance work is needed for those number of field devices with various frequencies. The work procedure also is different depending on the type and the like of the field device. The use of the field device not properly maintained (for example, uncalibrated) may lead to lowering the process control efficiency, increase in financial losses, and the like.

In plants where common industrial protocols such as HART and Foundation Fieldbus (registered trademark) are used, field operators that are field workers (hereinafter simply referred to as "operators") perform the maintenance work manually. The operator brings maintenance tools such as a handheld communicator, a multimeter, and other equipment to the plant. In such conventional maintenance work, the operator needs to go close to the field device (for example, less than one meter) and spend some time working at that location. For example, the work such as opening the cover of the field device, connecting the communicator via cables, acquiring data from the field device, and thereafter, restoring it to the original state. Such kind of task arises.

The field devices may be located in dangerous locations such as high places, unstable places, dark places, hot places, and noisy places, and the maintenance work often poses a risk. There is also a problem of a trade-off between the amount and quality of the maintenance work and the number of man-hours of the operator to cope with numerous field devices. Many improvement technologies are in progress, but still not enough. Meanwhile, the field devices used mainly in the field are two-wired field devices with low-power operation, and thus the functions are limited.

Technologies important for improving the maintenance work will be described in two parts. The first is non-contact technology applications such as bar code scanning, near-field communication (NFC), and passive radio frequency identification (RFID). Such a non-contact technology application can reduce the work time associated with wired connections. However, it is still needed for the operator to go close to the field device. Bar code scanning also remains a problem as it is difficult to perform in a dark place, a shaky place, or the like. The second is wireless technology. However, WLANs (for example, IEEE 802.11x) have high power consumption. IrDA needs the operator to access the field devices from one direction and is not convenient in situations where the field devices are located at different heights and are difficult to make access by using IrDA.

ISA100, WirelessHART, and the like are used as industrial wireless protocols, but these are not configured to be easily used for maintenance work. For example, the light fidelity (Li-Fi) technology disclosed in U.S. Patent Application Publication No. 2019/0052638 needs a controller function in a network for authentication and data communication. Bluetooth low energy (BLE) is one of the technologies to be considered. However, the existing BLE applications used in plant control (such as process automation) are limited.

As in the foregoing, there are various problems with the conventional technologies. For example, for the maintenance work, the operator needs to go close to the field device (for example, less than one meter). The implementation of non-contact technologies such as bar code, NFC, and passive RFID needs the redesign, replacement, and the like of the existing field devices. Some wireless technologies such as WLAN consume significant electric power and are not suitable for the implementation in the existing two-wired field devices. In addition, the use of WLAN, ISA100, WirelessHART, or the like increases the initial cost for installing the instrumentation of the plant and the like. ISA100, WirelessHART, or the like have quite complex specifications and configurations for maintenance work. IrDA has a large dependency on direction and angle for connection establishment. In the case of the non-contact technologies and IrDA, the maintenance work on each field device can be performed only one at a time. There is also a problem of increasing the amount of work to be performed as the operator needs to manually input the data acquired from many field devices into a PC or the like.

At least some of the above-described problems will be addressed by the technology being disclosed. For example, it will be possible to search for field devices and acquire data using wireless communication. The addition of a wireless communication device is relatively simple and allows the use of existing two-wired field devices. By the use of wireless communication, there is no need for the operator to stay close to the field device (for example, less than one meter) during maintenance work, as much as when non-contact technologies are used. Two-way communication with field devices within the range of wireless communication is also possible. Executing an application on a general-purpose mobile device such as a tablet device and a smartphone can perform maintenance work, whereby there is no need for specific tools such as handheld communicators. Rich and user-friendly UI such as selecting field devices in an image-based manner for acquiring data can be provided. It is possible to automatically search for and connect to multiple field devices located within the range of wireless communication and to efficiently acquire data (for example, at a faster data rate), whereby the time needed for maintenance work is significantly reduced. Storing and outputting acquired data in a common format file, or to generate a report with tables, graphs, and the like, makes it easy to provide data analysis and to exchange data with other applications. Enhancements of application functions allow flexibility in ensuring compatibility with other existing solutions and further with future technologies.

Embodiment

An exemplary embodiment will be described while referring to the accompanying drawings. Identical constituents, functions, and processing are denoted by identical reference signs, and the redundant explanations are omitted as appropriate.

Figure 1:
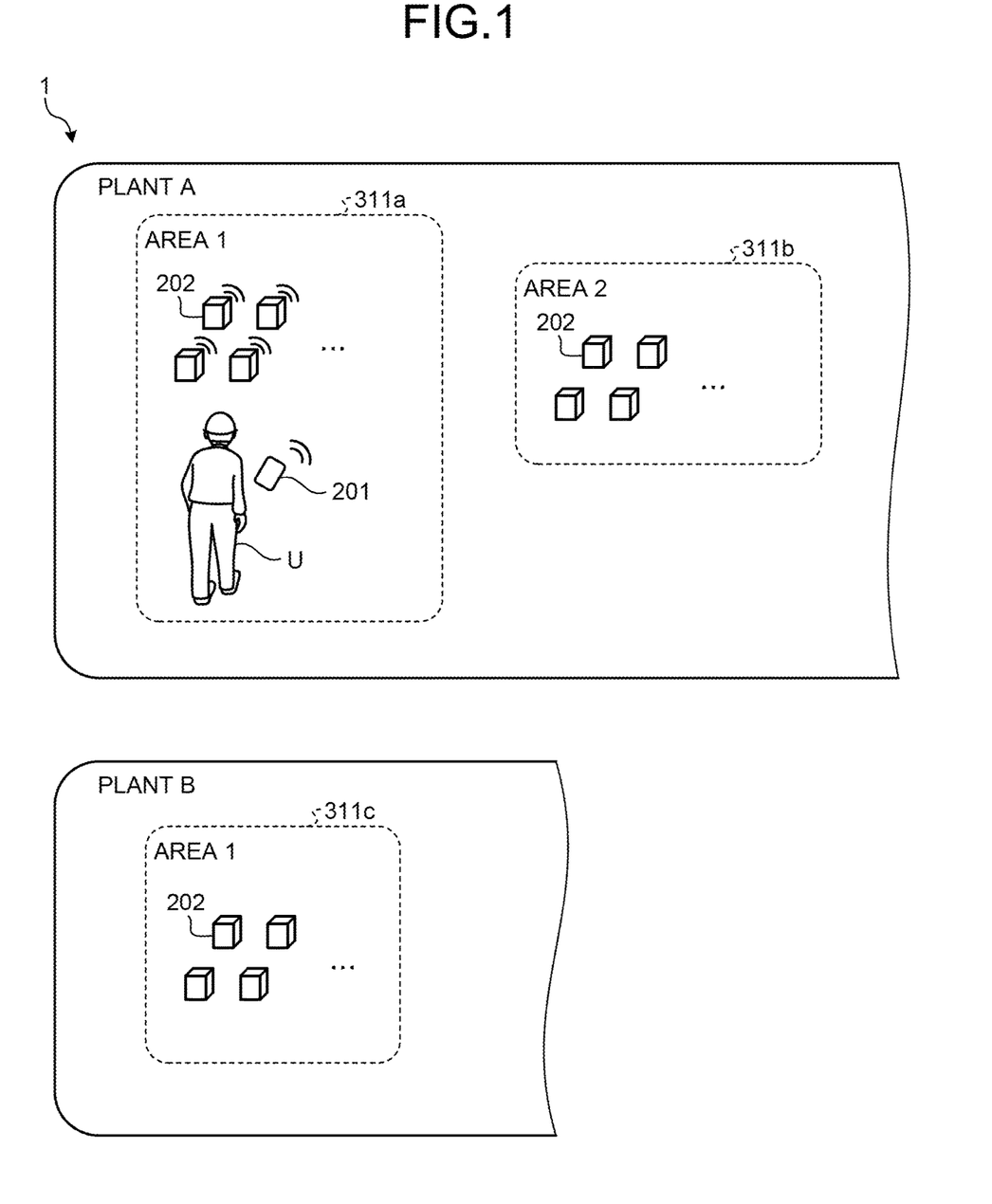
FIG. 1 is a diagram illustrating an example of a schematic configuration of an information processing system according to an embodiment.

FIG. 1 is a diagram illustrating an example of a schematic configuration of an information processing system 1 according to the embodiment. The information processing system 1 illustrated is applied to a plant. Examples of plants include industrial plants such as petroleum, chemicals, pharmaceuticals, and pulp as in the foregoing. FIG. 1 illustrates two plants of plant A and plant B. For example, the plant A and the plant B may be different types of plants. The plant A and the plant B may be of the same type and be separated into the first-floor portion and the second-floor portion within a building constituting the same type of plant.

The information processing system 1 includes a mobile device 201 and a number of field devices 202. For convenience, the field device 202 will be described first, and then, the mobile device 201 will be described.

The field devices 202 are provided (placed) in the plant. In the example illustrated in FIG. 1, a number of field devices 202 are provided in each of the plant A and the plant B. Examples of the field devices 202 include transmitters, flow meters, analyzers, and the like as in the foregoing. Each field device 202 is configured to allow wireless communication with the mobile device 201. Each field device 202 may, in order to transmit and receive data, perform wireless communication with the mobile device 201 by having an internal radio communication capability, or by using an external device for radio communication that is connected in a wired manner (for example, attaching a wireless communication adaptor to the field device 202).

In the information processing system 1, the field devices 202 are managed by being grouped for each area. The areas are defined for each plant, and thus, the field devices 202 are grouped for each area of the plant (plant area). FIG. 1 illustrates, as plant areas, a plant area 311$a$, a plant area 311$b$, and a plant area 311$c$. The plant area 311$a$ is area 1 of the plant A. The plant area 311$b$ is area 2 of the plant A. The plant area 311$c$ is area 1 of the plant B. The areas may be physically partitioned areas, or an area where an individual sub-process from the overall process control system occurs. Examples of individual sub-processes include raw-material input processes, chemical reaction processes, molding processes, and the like.

The mobile device 201 is used for maintenance work of the field devices 202. The maintenance work includes the acquisition of data of the field devices 202, and the mobile device 201 acquires data from the field devices 202 using wireless communication with the field devices 202. Examples of data include sensor measurement data, device parameters, device status information (health information), and the like of the field device 202. Examples of the measurement data include a flow value and the like if the field device 202 is a flow meter. Examples of the device parameters include the upper limit value, lower limit value, and the like of the measuring range of the measurement value. Examples of the status information include the abnormality existence flag and the like of the field device 202.

The mobile device 201 illustrated in FIG. 1 is a smartphone. However, in addition to a smartphone, various mobile terminals such as tablet devices and laptop computers may be used as the mobile device 201.

A user of the mobile device 201 is referred to and illustrated as user U. Examples of the user U include operators (such as field workers) of the plant. The user U carries the mobile device 201 and goes to any of the plant areas and, using the mobile device 201, acquires data from the field devices 202 provided in the relevant plant area (within the relevant plant area).

Figure 2:
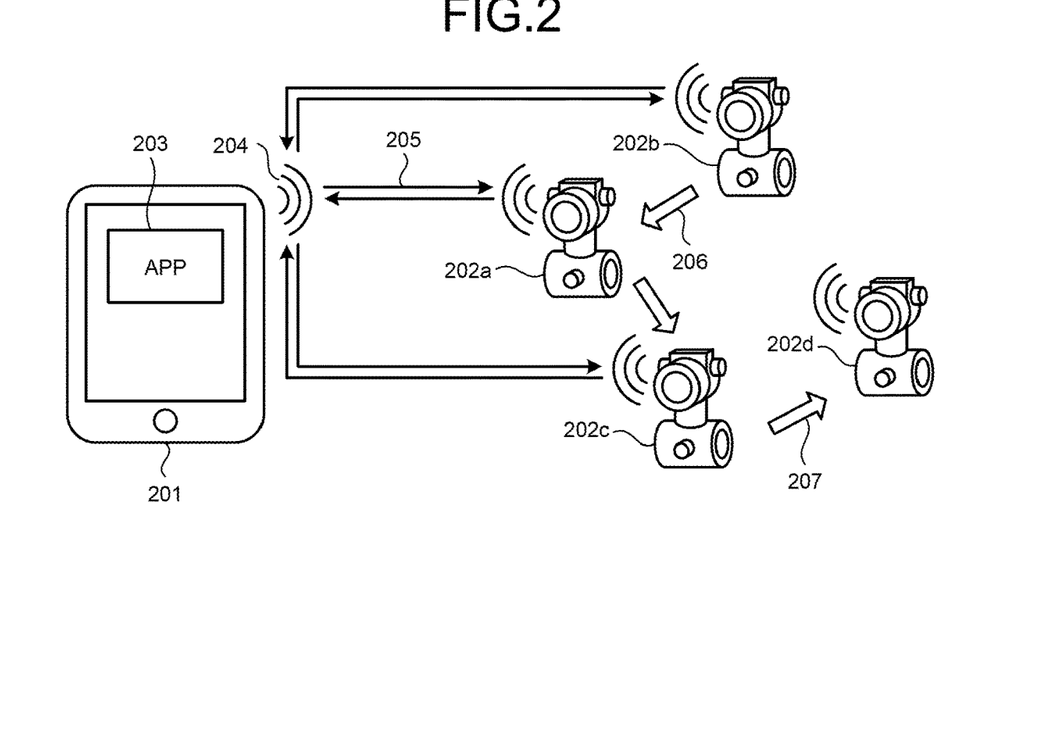
FIG. 2 is a diagram schematically illustrating the acquisition of data of field devices by a mobile device.

FIG. 2 is a diagram schematically illustrating the acquisition of data of the field devices 202 by the mobile device 201. As the field devices 202 to be objects of data acquisition, field devices 202a to 202d (all are flow meters in this example) are illustrated.

The mobile device 201 has an application 203 (app) installed. The app 203 is an application for maintenance work of the field devices 202. The app 203 executes data acquisition using wireless communication 204 between the mobile device 201 and the field device 202. The wireless communication 204 includes two-way communication 205 (such as transmitting and receiving/exchanging of data) between the mobile device 201 and the operating field device 202. For the wireless communication 204, wireless communication of low power consumption such as BLE may be used.

The data of the field device 202 (either manually selected or automatically searched, will be explained later), is acquired using the wireless communication 204. For example, as schematically illustrated as an arrow 206 and an arrow 207 in FIG. 2, the data of the field device 202b, the data of the field device 202a, the data of the field device 202c, and the data of the field device 202d are acquired in sequence (can be collected in a short time).

Figure 3:
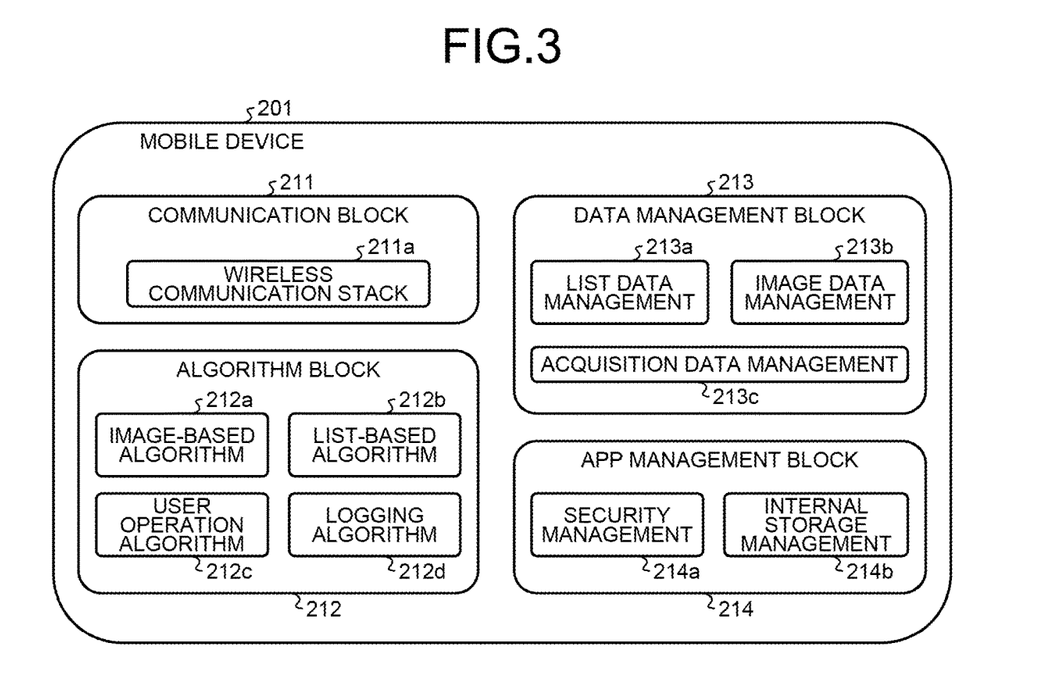
FIG. 3 is a diagram illustrating an example of a functional block of the mobile device implemented by an app.

FIG. 3 is a diagram illustrating an example of a functional block of the mobile device 201 implemented by the app 203. The mobile device 201 includes, as main functional blocks, a communication block 211, an algorithm block 212, a data management block 213, and an app management block 214.

The communication block 211 is a portion that performs communication (communication unit) with the field devices 202. The communication block 211 includes a wireless communication stack 211a. The wireless communication stack 211a executes processing needed for the wireless communication 204 with the field device 202 (FIG. 2), such as the processing based on wireless communication protocol, for example. The wireless communication stack 211a may be implemented in a radio such as the above-described wireless communication adaptor.

The algorithm block 212 is a portion that executes processing by various algorithms (processing unit). As the algorithms, an image-based algorithm 212a, a list-based algorithm 212b, a user operation algorithm 212c, and a logging algorithm 212d are illustrated.

The image-based algorithm 212a and the list-based algorithm 212b are algorithms for acquiring data from the field device 202. The image-based algorithm 212a and the list-based algorithm 212b acquire data using the wireless communication 204 from, out of a number of field devices 202 managed by the data management block 213, which will be described later, the field devices 202 provided in the plant area selected by user operation. Although detailed later, the image-based algorithm 212a executes selection processing of the field device 202, data acquisition processing, and the like in an image-based manner. The list-based algorithm 212b executes automatic search (discovery) processing of the field device 202, data acquisition processing, and the like in a list-based manner.

The user operation algorithm 212c performs processing of receiving (inputting) of user operations and the like. Hereinafter, unless otherwise described, it is assumed that user operations are processed by the user operation algorithm 212c.

The logging algorithm 212d generates log information about the app 203, more specifically, log information such as a device ID, acquired data, and date and time of acquisition concerning the data acquisition from the field device 202. This allows history information such as operations, actions, and processing (activities) of the app 203 concerning the data acquisition to be retained. It is also possible to trace back what data was acquired from which device and when.

The data management block 213 is a portion that stores and manages various data (data management unit) using an internal database not depicted. As the main data management, list data management 213a, image data management 213b, and acquisition data management 213c are illustrated.

The list data management 213a manages (list management) the field devices 202 that are grouped for each plant area. The list describes the name of each plant area in association with tag information about the field devices 202 placed in each plant area, for example. This list is maintained for use in list-based consecutive access, which will be described later.

The image data management 213b manages images of the plant, more specifically, images of the plant areas (for example, see FIG. 5 described later) and position information (such as coordinates) about each field device 202 in each image. In addition, the image data management 213b also manages tag information about the field devices 202, communication protocol information used for the wireless communication 204 with the field devices 202, and the like. The tag information is the information that can uniquely identify the field device 202. Examples of tag information include the type, a serial number, or the like of the field device 202.

The acquisition data management 213c manages the acquired data of the field device 202 in association with (for example, tag information about) the relevant field device 202.

The app management block 214 is a portion that performs the management (app management unit) of the app 203. As the management, security management 214a and internal storage management 214b are illustrated.

The security management 214a manages credential information. For example, the credential information is the information about the user's authority (credentials) that allows at least a part of the processing of the algorithm block 212 based on the user operation to be executed. Examples of the credentials include user eligibility of the algorithm block 212 by the user U (such as log-in credentials available), access credentials of the wireless communication 204 to the field device 202 using the algorithm block 212 by the user U (accessible access credential information), and the like. A specific example of the credential information is a personal identification number (PIN) code. In addition to or in lieu of the PIN code, other types of credential information may be used.

The internal storage management 214b manages various types of data stored in a storage (storage unit) not depicted in the mobile device 201. For example, the internal storage management 214b provides an interface that allows the user U or an external device to access the managed data.

Further details of each of the above-described functional blocks of the mobile device 201 will be described subsequently with reference to FIG. 4 and subsequent drawings.

Figure 4:
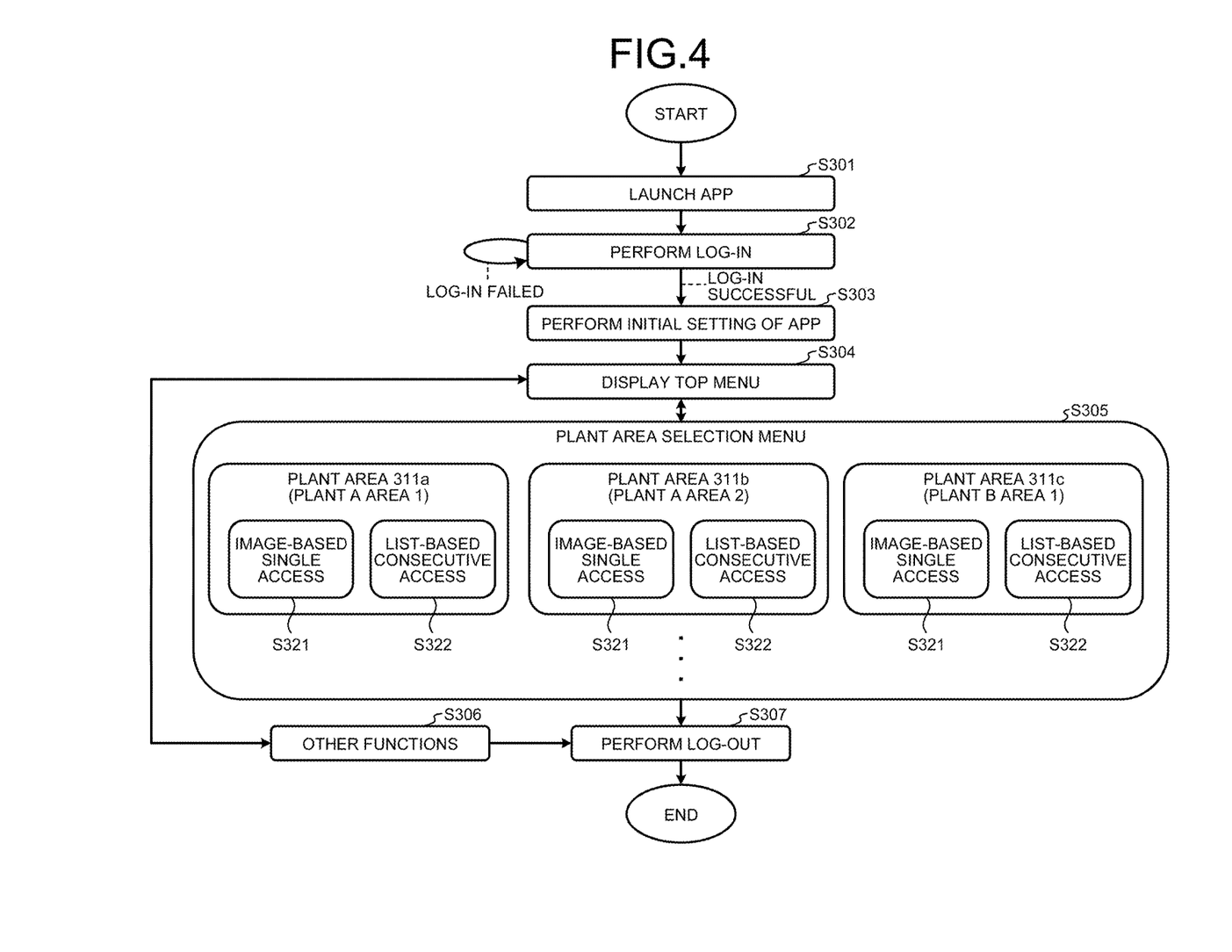
FIG. 4 is a flowchart illustrating an example of processing that is executed in the mobile device.

FIG. 4 is a flowchart illustrating an example of processing (information processing method) that is executed in the mobile device 201.

At Step S301, the app 203 is launched. By the user operation, the app 203 is launched.

At Step S302, log-in is performed. The security management 214a of the app management block 214 causes the mobile device 201 to display a log-in screen. By the user operation, information about user eligibility (for example, log-in credential information such as PIN code) is input. The security management 214a checks whether the credential information that have been input are appropriate credential information. When the log-in is successful, the processing proceeds to Step S303. When the log-in fails, the processing of Step S302 is repeated.

At Step S303, the initial setting of the app 203 is performed. The initial setting includes the initial setting of the image-based algorithm 212a and the list-based algorithm 212b of the algorithm block 212.

In the initial setting of the image-based algorithm 212a, by the user operation, images of one or more plant areas are registered (uploaded to the app 203). The image-based algorithm 212a causes the mobile device 201 to display the images of the respective plant areas that are prepared in advance and are managed by the image data management 213b of the data management block 213 in a selectable manner. The user U selects and registers the image of the desired plant area from the images of the respective plant areas that have been uploaded and displayed. For each registered image (per plant area), a number of field devices 202 provided in the relevant plant area are grouped in association with it. The results of the grouping (in this case, registered images) may be managed by the list data management 213a of the data management block 213. The grouping may be performed by the user operation under the control of the image-based algorithm 212a or may be performed by a higher-level device relative to the mobile device 201 (such as a server device capable of communicating with the mobile device 201).

Figure 5:
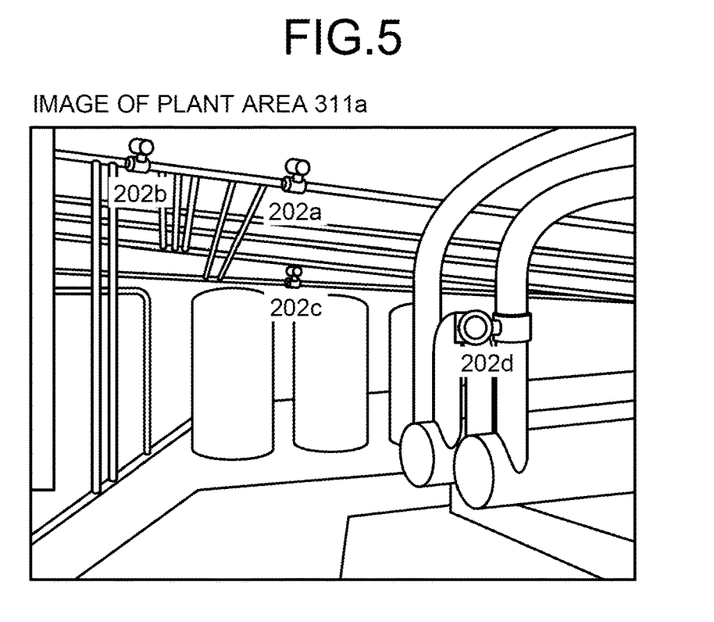
FIG. 5 is a diagram illustrating an example of an image of a plant area uploaded.

FIG. 5 is a diagram illustrating an example of the image of a plant area to be uploaded. The image of the plant area 311a including the field device 202a to the field device 202d is illustrated. Various images of such plant areas are prepared, allowing the user U to easily select the desired plant area while viewing the images, for example.

Meanwhile, in the initial setting of the list-based algorithm 212b, by the user operation, a table (list) of the field devices 202 grouped for each plant area is generated. That is, a number of field devices 202 are sorted by and associated with each plant area. The results of the grouping (in this case, generated list) may be managed by the list data management 213a of the data management block 213. The list generation may be performed by the user operation under the control of the list-based algorithm 212b or may be performed by a higher-level device relative to the mobile device 201.

Figure 6:
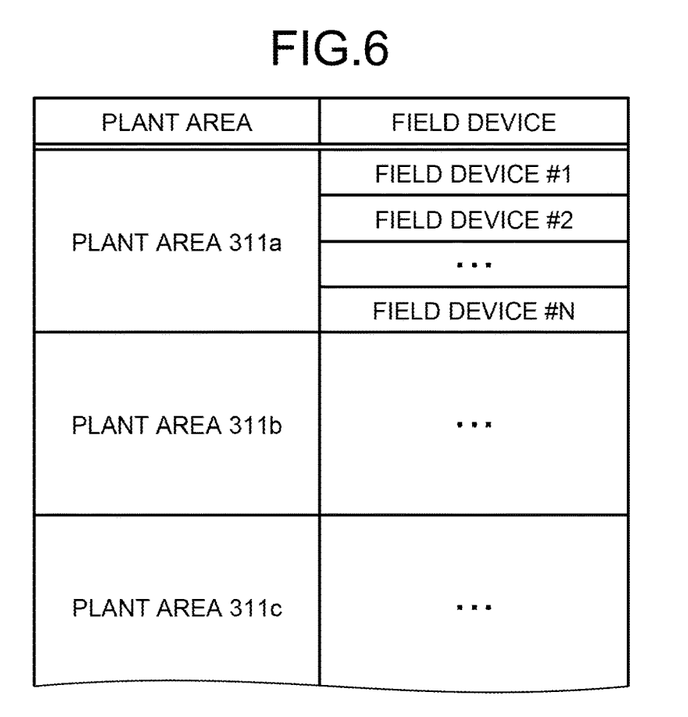
FIG. 6 is a table illustrating an example of a generated list.

FIG. 6 is a table illustrating an example of a generated list. A number of field devices 202 are grouped into the plant area 311a to the plant area 311c. In the plant area 311a, N pieces of the field devices 202 are associated with it. The first field device 202, the second field device 202, and the Nth field device 202 are schematically illustrated as "field device #1", "field device #2", and "field device #N", respectively.

Referring back to FIG. 4, at Step S304, the top menu is displayed. The algorithm block 212 causes the mobile device 201 to display the top menu that allows the selection of and transition to various processing (tasks) of the app 203. As options, Step S305 (plant-area selection menu) and Step S306 (other functions) are illustrated.

At Step S305, the plant-area selection menu is displayed. The algorithm block 212 causes the mobile device 201 to display the plant areas that have been initially set at the previous Step S303 in a selectable manner. In this example, the plant area 311a, the plant area 311b, and the plant area 311c are displayed to be selectable. The user U carries the mobile device 201 and goes to the desired plant area and, on the plant-area selection menu, selects the relevant plant area together with either of the image-based single access (Step S321) and the list-based consecutive access (Step S322). The data of the field devices 202 provided in the selected plant area is acquired by the selected access method. Details will be described later.

At Step S306, other functions are performed. Other functions are the functions other than the image-based single access and the list-based consecutive access at the above-described Step S305, and details will be described later.

After the processing at Step S305 or Step S306 is completed (after the task is finished), the processing proceeds to Step S307.

At Step S307, log-out is performed. As log-out is instructed by the user operation, the security management 214a of the app management block 214 returns the app 203 to the state before log-in. The app 203 may be terminated together with log-out.

The image-based single access (Step S321) and the list-based consecutive access (Step S322) selected at the above-described Step S305 will be described with reference to FIG. 7 to FIG. 10.

Figure 7:
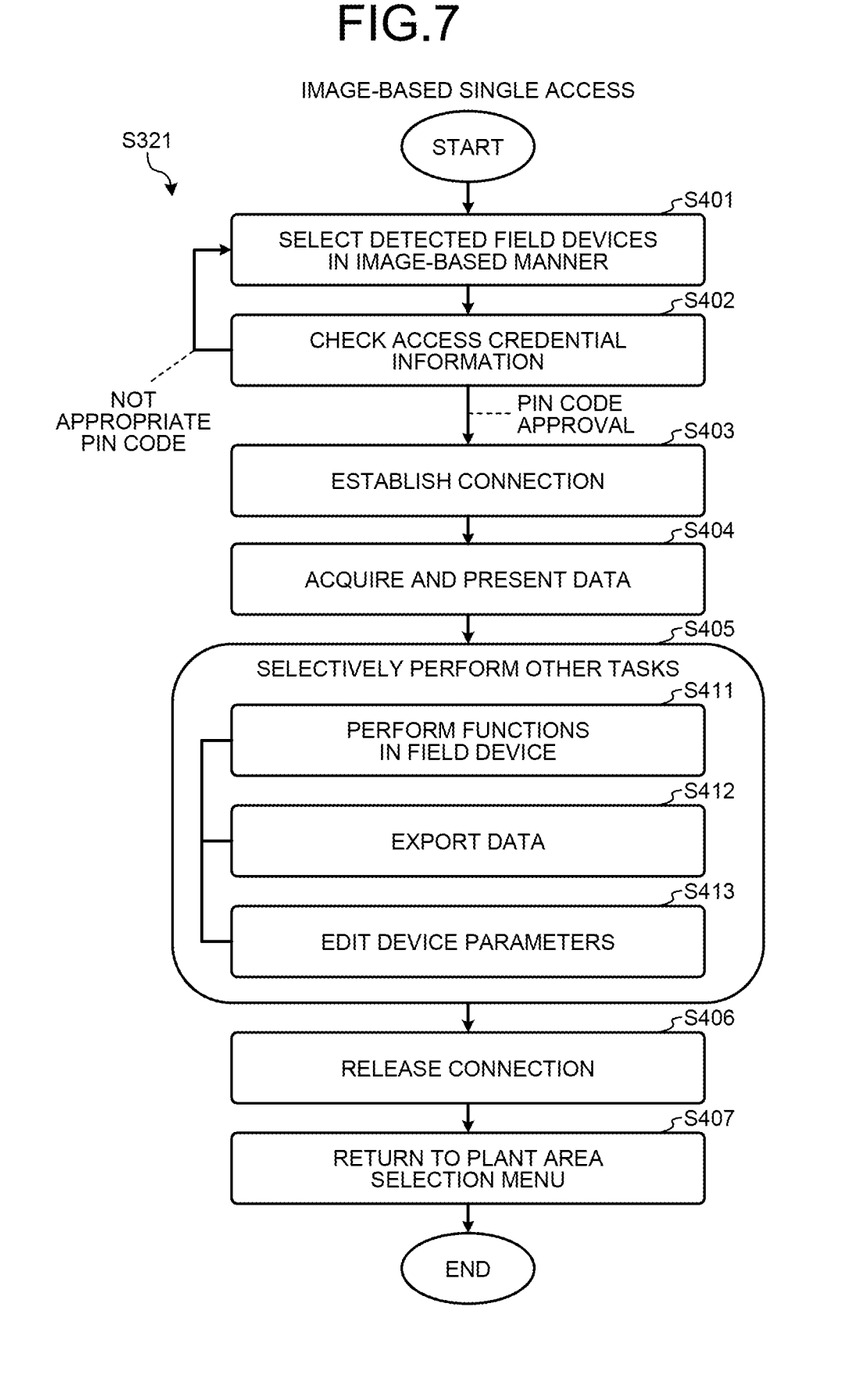
FIG. 7 is a flowchart illustrating an example of processing that is executed in image-based single access.

FIG. 7 is a flowchart illustrating an example of processing (information processing method) that is executed in the image-based single access. The image-based algorithm 212a acquires data from the field device 202 selected by the user operation out of the field devices 202 indicated in the image of the plant area selected by the user operation. The selection of the field device 202 of the data acquisition target by the user operation is performed easily using the image of the plant area.

At Step S401, the detected field devices 202 are selected on an image-based basis. The image-based algorithm 212a detects the field devices 202 capable of the wireless communication 204 using the wireless communication stack 211a of the communication block 211. The image-based algorithm 212a causes the mobile device 201 to display the image of the plant area with which the tags of the detected field devices 202 are associated. Tagging indicates that the tag information is associated with the field devices 202 and displayed. Tagging may be performed by the user operation under the control of the image-based algorithm 212a or may be performed by a higher-level device relative to the mobile device 201. The tag information is managed by the image data management 213*b* of the data management block 213 as in the foregoing. Any of the field devices 202 indicated in the image is selected by the user operation such as one click (or tap).

Figure 8:
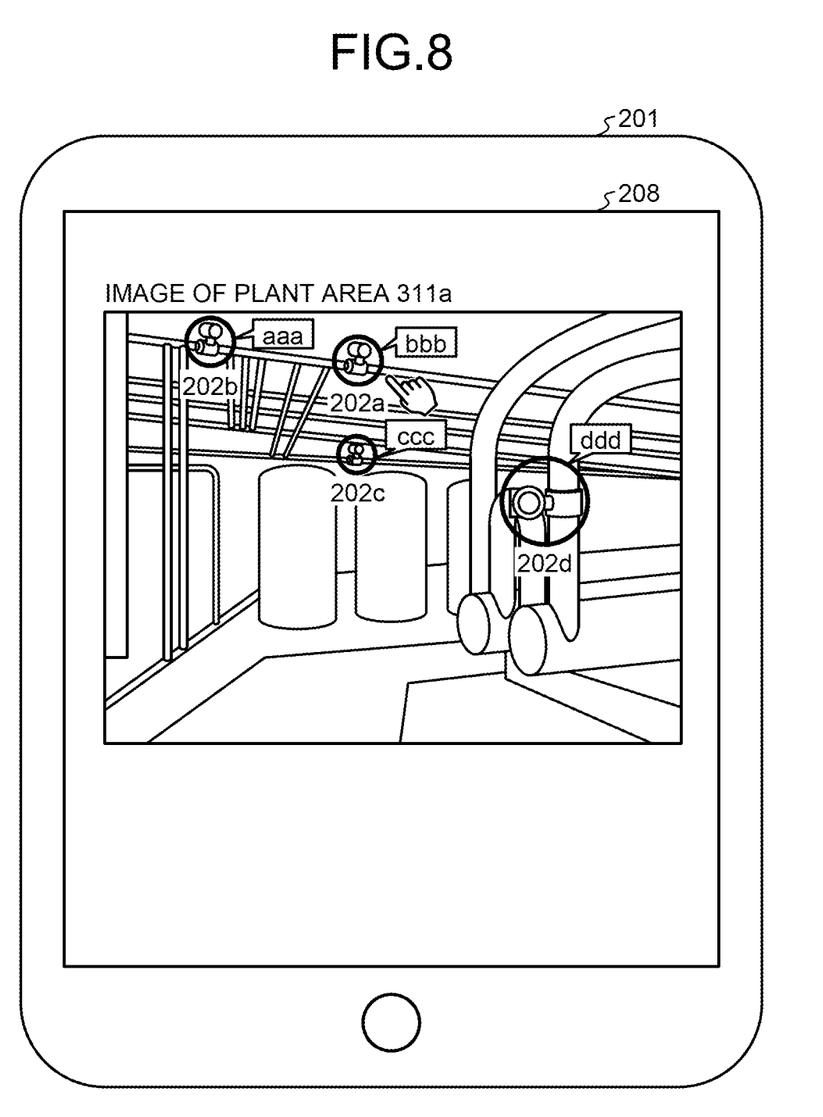
FIG. 8 is a diagram illustrating an example of the selection operation of the field device.

FIG. 8 is a diagram illustrating an example of the selection operation of the field device 202. On a display screen 208 of the mobile device 201, the image of the plant area 311*a* including the field device 202*a* to the field device 202*d* is displayed. The field device 202*a* to the field device 202*d* are displayed being associated with schematically illustrated tag information "aaa" to "ddd", respectively. In this example, by pointing operation, the field device 202*a* is selected.

Referring back to FIG. 7, at Step 3402, the wireless communication access credential information is checked. The security management 214*a* of the app management block 214 causes the mobile device 201 to display a check screen. By the user operation, access credential information (for example, PIN code) are input. The security management 214*a* checks the access credential information that have been input. When appropriate access credential information is input and the check is completed, the processing proceeds to Step S403. When access credential information not appropriate are input, the processing is returned to Step S401 or the processing of Step S402 is repeated.

At Step S403, a connection is established. The image-based algorithm 212*a* starts the wireless communication 204 with the field device 202 selected by the user operation using the wireless communication stack 211*a* of the communication block 211. The communication protocol information needed at that time is acquired from the image data management 213*b* of the data management block 213 by the image-based algorithm 212*a*.

At Step S404, data is acquired and presented. The image-based algorithm 212*a* acquires data from the field device 202 to which the connection has been established using the wireless communication stack 211*a* of the communication block 211. The image-based algorithm 212*a* causes the acquisition data management 213*c* of the data management block 213 to manage (such as storing) the acquired data. In addition, the image-based algorithm 212*a* causes the mobile device 201 to display the data so that the acquired data is presented to the user U.

At Step S405, other tasks are selectively performed. As options, Step S411 to Step S413 are illustrated.

At Step S411, the functions (built-in functions) in the field device 202 are performed. Examples of the built-in functions include calibration, output testing, diagnostic checking, and the like. The image-based algorithm 212*a* transmits commands to make the field device 202 execute the built-in functions to the field device 202 using the wireless communication stack 211*a* of the communication block 211.

At Step S412, data is exported. The image-based algorithm 212*a* generates at least one of a file that includes the acquired data (hereinafter also referred to as "report and the like"). The report and the like may be generated in a general format that can be used on a general-purpose computer (such as PC). The image-based algorithm 212*a* may cause the mobile device 201 to display the generated report and the like. The image-based algorithm 212*a* may output (such as data transmission) the generated report and the like to the outside via the internal storage management 214*b* of the app management block 214.

At Step S413, device parameters displayed on the mobile device 201 are edited. For example, the device parameters of the field device 202 selected by the user operation are displayed on the mobile device 201 in an editable manner. The user U operates the mobile device 201 and edits the displayed device parameters. The image-based algorithm 212*a* transmits information about the relevant device parameters to the field device 202 using the wireless communication stack 211*a* of the communication block 211 so that the edited device parameters are actually reflected (updated, set, and the like) on the field device 202.

At Step S406, the connection is released. The image-based algorithm 212*a* terminates the wireless communication 204 using the wireless communication stack 211*a* of the communication block 211 with the field device 202.

At Step S407, it returns to the plant-area selection menu. The image-based algorithm 212*a* returns the processing to Step S305 (FIG. 4). When the data acquisition is to be performed in succession in the same plant area, the user U selects the image-based single access or the list-based consecutive access of the same plant area (Step S321 or Step S322). When the data acquisition is to be performed in another plant area, the user U moves over to the other plant area and then selects the image-based single access or the list-based consecutive access of the plant area of destination (Step S321 or Step S322).

Figure 9:
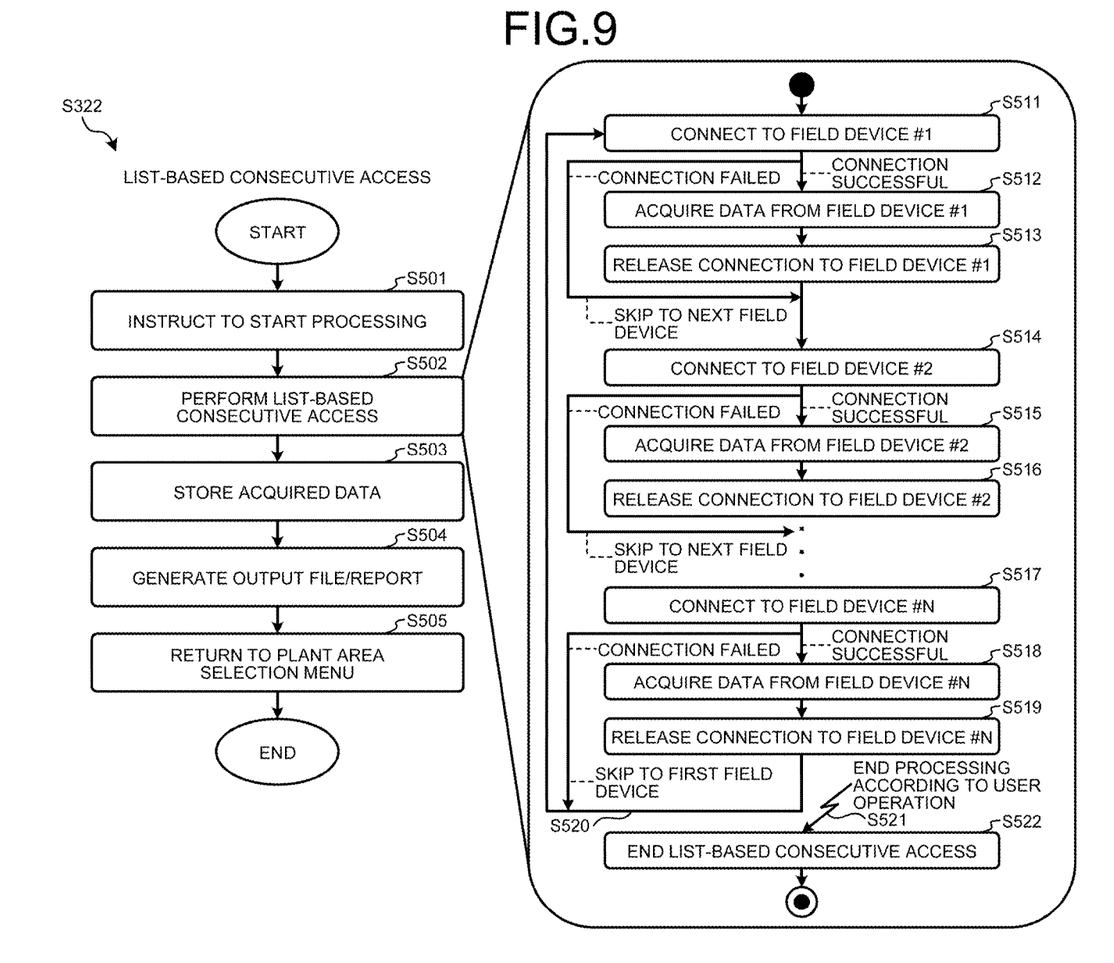
FIG. 9 is a flowchart illustrating an example of processing that is executed in list-based consecutive access.

FIG. 9 is a flowchart illustrating an example of processing (information processing method) that is executed in the list-based consecutive access. The list-based algorithm 212*b* automatically acquires data from, out of a number of field devices 202 managed in a list-based manner by the list data management 213*a* of the data management block 213, the field devices 202 provided in the plant area selected by the user operation. The field devices 202 that are listed in the list are automatically searched, and the data is automatically acquired.

At Step S501, the start of processing is instructed. The list-based algorithm 212*b* causes the mobile device 201 to display a screen on which the start of processing of list-based consecutive access can be instructed. By the user operation, the start of processing is instructed. With this instruction as a trigger, the field devices 202 indicated in the list generated at the previous Step S303 (FIG. 4) are set as the field devices of the data acquisition target.

At Step S502, list-based consecutive access is performed. Specifically, the processing of the first sub-step to the third sub-step, which will be described next, is repeatedly performed. Of Step S511 to Step S519 illustrated on the right side in FIG. 8, each of Step S511, Step S514, and Step S517 is the first sub-step. Each of Step S512, Step S515, and Step S518 is the second sub-step. Each of Step S513, Step S516, and Step S519 is the third sub-step.

At Step S511, the first field device 202 (field device #1) is connected. The list-based algorithm 212*b* searches for the first field device 202 by searching means (such as polling) using the wireless communication stack 211*a* of the communication block 211. When the first field device 202 is found, the image-based algorithm 212*a* starts the wireless communication 204 with the found field device 202 using the wireless communication stack 211*a* of the communication block 211 (establishes connection). The communication protocol information needed at that time is acquired from the image data management 213*b* of the data management block 213 by the list-based algorithm 212*b*. When the connection is successful, the processing proceeds to Step S512. When the field device 202 is not found or the connection fails (connection fail), Step S512 and Step S513 are skipped and the processing proceeds to Step S514 in order to connect to the second field device 202 (field device #2).

At Step S512, the data is acquired from the first field device 202 for which the connection is successful. The list-based algorithm 212b acquires data from the connected field device 202 using the wireless communication stack 211a of the communication block 211. The list-based algorithm 212b stores the acquired data in a temporary memory (such as cache). The list-based algorithm 212b marks in the list the field devices 202 for which the acquisition and storage have been finished so that they can be distinguished.

At Step S513, the connection to the first field device 202 is released. The list-based algorithm 212b terminates the wireless communication 204 with the first field device 202 using the wireless communication stack 211a of the communication block 211.

The processing at Step S514 to Step S516 is performed on the second field device 202 (field device #2). The detailed processing is described in the same manner as those described in the foregoing Step S511 to Step S513. On the third and subsequent field devices 202 also, the same processing is performed in sequence.

The processing at Step S517 to Step S519 is performed on the Nth field device 202. Because the Nth field device 202 is the last field device 202 in the list, when the connection fails at Step S517 or the processing at Step S519 is completed, the processing is returned to Step S511 as indicated by Step S520.

At Step S521, the processing is ended in response to the user operation. The list-based algorithm 212b causes the mobile device 201 to display a screen on which the end of processing of list-based consecutive access can be instructed. By the user operation, at any timing, the end of processing is instructed. With this instruction as a trigger, looping from Step S511 to Step S520 is stopped and the processing proceeds to Step S522.

At Step S522, the list-based consecutive access is ended. The processing proceeds to Step S503.

Figure 10:
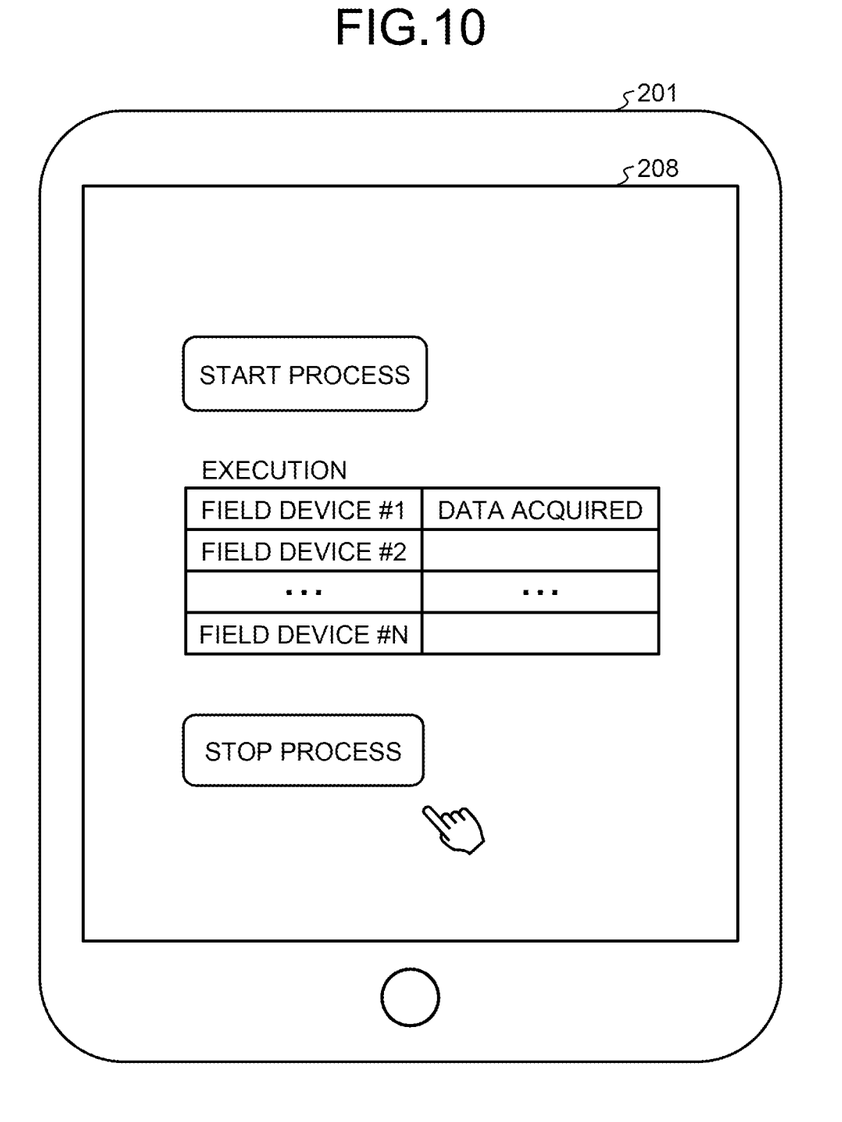
FIG. 10 is a diagram illustrating an example of the start and end operation of the list-based consecutive access.

FIG. 10 is a diagram illustrating an example of the start and end operation of the list-based consecutive access. On the display screen 208 of the mobile device 201, an operation screen is displayed. The display screen lists the field devices 202 provided in the plant area selected by the user operation. When "start process" is selected, as described at the previous Step S501, the start of processing of list-based consecutive access is instructed. While the processing at Step S502, more specifically, the processing from Step S511 to Step S520 is repeated, "execution" indicating that the processing is in progress is displayed together with the list. As described at the previous Step S512, the field devices 202 for which the acquisition and storage of data have been finished are marked in the list. In this example, the field device #1 has finished acquiring and storing data, and thus is marked as "data acquired". When "stop process" is selected, as described at the previous Step S521, the end of processing of the list-based consecutive access is instructed.

Referring back to FIG. 9, at Step S503, the acquired data is stored. The list-based algorithm 212b organizes data that has been acquired and temporarily stored at Step S512, Step S515, Step S518, and so on (the second sub-step) and causes the acquisition data management 213c of the data management block 213 to manage (such as storing) the data. An example of data organization is sorting in the order of data acquisition time. Another example of data organization is grouping the data for each location. For example, the list-based algorithm 212b organizes data of the field devices 202 located in a predetermined range by grouping. At that time, the position information in the algorithm block 212 managed by the list data management 213a of the data management block 213 may be referred. Yet another example of data organization is data extraction at the time of occurrence of abnormality of the field device 202. For example, the list-based algorithm 212b extracts data of the field device 202 for which status information indicating abnormality is acquired as data.

At Step S504, the output file/report is generated. The list-based algorithm 212b generates a report and the like that includes the acquired and stored data.

At Step S505, it returns to the plant-area selection menu. The list-based algorithm 212b returns the processing to Step S305 (FIG. 4). When the data acquisition is to be performed in succession in the same plant area, the user U selects the image-based single access or the list-based consecutive access of the same plant area (Step S321 or Step S322). When the data acquisition is to be performed in another plant area, the user U moves over to the other plant area and then selects the image-based single access or the list-based consecutive access of the plant area of destination (Step S321 or Step S322).

Referring back to FIG. 4, the other functions that is performed at Step 3306 will be described. The app 203 is enhanced in function so as to include as the other functions various functions for the digitalization, optimization, and the like of the maintenance work of the field devices 202. Some specific examples will be described.

The other functions may include the function of setting changes in the image-based single access and the list-based consecutive access (Step S321 and Step S322). It can also be said that it is a change function of the initial setting of the app 203 (Step S303). For example, adding, deleting, and the like of the images of plant areas used in the image-based single access may be performed. The changing, deleting, and the like (image tagging change, image tagging deletion) of the field device 202 tagged to the image may be performed. The updating and the like of the list used in the list-based consecutive access may be performed. These functions may be performed by the image-based algorithm 212a and the list-based algorithm 212b of the algorithm block 212.

The other functions may include a function of checking the activity log of the app 203. For example, the operation history of the app 203 may be presented (such as displaying) to the user U. This function may be performed by the logging algorithm 212d of the algorithm block 212.

The other functions may include a function concerning the settings for user accounts of the app 203 such as password changes, for example. This function may be performed by the security management 214a of the app management block 214.

The other functions may include a function of acquiring (and further displaying) information (support information) to support the maintenance work (activities) of the field devices 202 performed by the user U. Examples of support information include information on links to parties (such as vendor sites) relating to related documents, other useful applications or tools other than the app 203, and the like. For example, the mobile device 201 may be controlled so that the mobile device 201 acquires and displays information relating to user manuals, datasheets, and authentication concerning the field devices 202. The support information may be prepared in advance and stored in the mobile device 201 (for example, may be managed by the data management block 213) or may be acquired from the outside of the mobile device 201. When the support information is acquired from the outside, the mobile device 201 may be controlled so as to access a website (such as HP) of the vendor of the field devices 202 via a network such as the Internet, acquire the document (such as downloading), and display it. This function may be performed by the algorithm block 212.

Various function enhancements other than the foregoing may be implemented to the app 203 as the other functions. For example, the functions of list-based consecutive access can also be extended to the concept of an unattended plant. In the unattended plant concept, not the user U (such as operator) but mobile bodies (smart machines) that autonomously move such as robots and drones go to the plant area and perform maintenance work such as data acquisition. Such a mobile body is also one aspect of the mobile device 201.

According to the above-described information processing system 1, it is possible to search for the field devices 202 and acquire data using the wireless communication 204. The addition of a wireless communication device can be made relatively easily even with two-wired field devices, whereby even if the field device 202 is of a two-wired field device, it can be used as is. By the use of the wireless communication 204, there is no need for the user U to stay close to the field device (for example, less than one meter) during the maintenance work, as much as when non-contact technologies are used, for example. Two-way communication 205 with the field devices 202 within the range of the wireless communication 204 is also possible. Executing the app 203 on the general-purpose mobile device 201 such as a tablet device and a smartphone allows maintenance work such as data acquisition to be carried out, whereby there is no need for specific tools such as a handheld communicator. Rich and user-friendly UI such as selecting the field devices 202 in an image-based manner and acquiring data (image-based single access) can be provided. It is possible to automatically search for and connect to a number of field devices 202 located within the range of the wireless communication 204 and to efficiently acquire data (for example, at a fast data rate), whereby the time needed for maintenance work can be significantly reduced. Storing and outputting the acquired data in a file of a common format, a report, or the like makes it easy to provide data analysis and exchange data with other applications. Function enhancements of the app 203 allow flexibility in ensuring compatibility with other existing solutions and further with future technologies.

The mobile device 201 can efficiently acquire data of the field devices 202, whereby the labor and the like of the operator needed for maintenance work is reduced. For example, the operator can concentrate on problem analysis, work efficiency, diagnosis of the field device 202, and the like by that amount.

Figure 11:
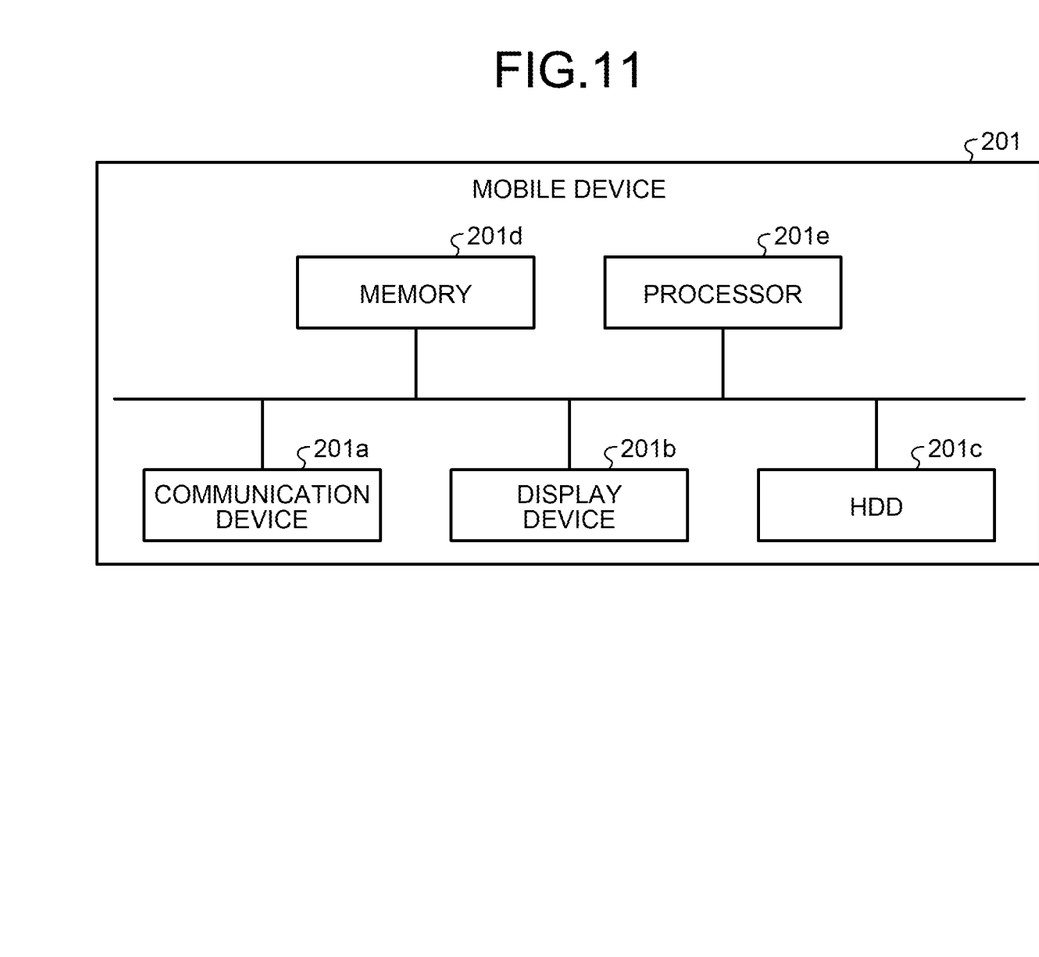
FIG. 11 is a diagram illustrating an example of a hardware configuration of the mobile device.

FIG. 11 is a diagram illustrating an example of a hardware configuration of the mobile device 201. A computer and the like having the illustrated hardware configuration functions as the mobile device 201 that has been described so far. The hardware configuration illustrated includes a communication device 201a, a display device 201b, a hard disk drive (HDD) 201c, a memory 201d, and a processor 201e connected to one another via a bus and the like.

The communication device 201a is a network interface card and the like and allows communication with other devices. The display device 201b is a touch panel, a display, or the like, for example. The HDD 201c functions as the data management block 213 and the app management block 214. The HDD 201c also stores therein a computer program to cause the computer to execute the processing of the mobile device 201 (processing of app 203).

The processor 201e reads out the above-described computer program from the HDD 201c and the like and loads it on the memory 201d, thereby causing the computer to function as the mobile device 201. The functions include the functions of the app 203 that have been described so far.

The above-described computer program can be distributed via a network such as the Internet. In addition, the computer program can be recorded on a computer-readable recording medium such as a hard disk, a flexible disk (FD), a CD-ROM, a magneto-optical (MO) disk, and a digital versatile disc (DVD) and executed by being read out from the recording medium by the computer.

As in the foregoing, one embodiment of the present disclosure has been described, but the disclosed technology is not limited to the above-described embodiment.

In the above-described embodiment, BLE has been cited as an example of the wireless communication 204, but various wireless communication other than BLE may be used.

The processing by the mobile device 201 (processing by the app 203) may be implemented by cloud computing and the like. For example, a part or all of the functions of the algorithm block 212, the data management block 213, and the app management block 214 of the mobile device 201 may be provided on devices outside the mobile device 201. The mobile device 201 may perform the above-described processing by communicating with such external devices.

The information processing system 1 described in the foregoing is specified as follows, for example. As has been described with reference to FIG. 1 to FIG. 10 and others, the information processing system 1 includes a number of field devices 202 provided in a plant (plant A, plant B, and so on) and the mobile device 201 that acquires data from the field devices 202. The mobile device 201 includes the data management block 213 (data management unit) and the algorithm block 212 (processing unit). The data management block 213 (list data management 213a thereof) manages a number of field devices 202 (field device 202a to field device 202d, field device #1 to field device #N, and the like) grouped for each plant area (plant area 311a to plant area 311c, and the like) (Step S303). The algorithm block 212 acquires data using the wireless communication 204 from, out of the field devices 202 managed by the data management block 213, the field devices 202 provided in the plant area selected by user operation (Step S305, Step S321, Step S322).

According to the above-described information processing system 1, the mobile device 201 acquires data using the wireless communication 204 from, out of a number of field devices 202 grouped for each plant area, the field devices 202 provided in the plant area selected by user operation. The data acquisition (collection) can be performed in units of plant areas, whereby the data of the field devices 202 can be acquired efficiently.

As has been described with reference to FIG. 7, FIG. 8, and others, the algorithm block 212 (image-based algorithm 212a thereof) may acquire data from, out of the field devices 202 indicated in the image of the plant area selected by the above-described user operation, the field devices 202 selected by (further) user operation (Step S321). This allows the selection and data acquisition of the field devices 202 in an image-based manner.

As has been described with reference to FIG. 6, FIG. 9, FIG. 10, and others, the data management block 213 (list data management 213a thereof) may manage in a list-based manner a number of field devices that are grouped and the algorithm block 212 (list-based algorithm 212b thereof) may acquire data from, out of the field devices 202 managed in a list-based manner by the data management block 213, the field devices 202 provided in the plant area selected by the user operation (Step S322). This allows the data of the field devices 202 that are provided in the selected plant area to be acquired collectively.

As has been described with reference to FIG. 7, FIG. 9, and others, the algorithm block 212 may generate at least one of a file including the acquired data and a report document, used to report the acquired data (Step S412, Step S504). For example, by presenting (such as displaying) the generated report and the like to the user U or outputting (such as data transfer) it to the devices outside the mobile device 201, the acquired data can be utilized.

As has been described with reference to FIG. 3, FIG. 4, FIG. 7, and others, the mobile device 201 may include the app management block 214 (app management unit) that checks (Step S302, Step S402) at least the credential information of the user's authority that allows at least a part of the processing of the algorithm block 212 based on the user operation to be executed. This allows the security to be improved and the safety and the like of the information processing system 1 to be ensured.

As has been described with reference to FIG. 7 and others, the algorithm block 212 may edit the parameters of the field device 202 (Step S413). Such maintenance work can also be performed using the mobile device 201.

As has been described with reference to FIG. 3 and others, the algorithm block 212 (logging algorithm 212d thereof) may generate log information concerning the data acquisition from the field devices 202. This allows the history information about the algorithm block 212 (app 203) to be kept. It also allows back-tracing and the like.

The algorithm block 212 may acquire and display the information to support the maintenance work of the field devices 202 performed by the user U. Such support information can be helpful to make the maintenance work efficient.

As has been described with reference to FIG. 1 and others, field devices 202 may, in order to transmit data, be connected in a wired manner to a radio that performs wireless communication with the mobile device 201. This allows data acquisition by using the wireless communication 204 even when the radio is not implemented in the field device 202 itself.

The mobile device 201, which has been described with reference to FIG. 1 to FIG. 10 and others, also is one of the embodiments. The mobile device 201 includes the data management block 213 (data management unit) and the algorithm block 212 (processing unit). The data management block 213 (list data management 213a thereof) manages field devices 202 (field device 202a to field device 202d, field device #1 to field device #N, and the like) grouped for each plant area (plant area 311a to plant area 311c, and so on) (Step S303). The algorithm block 212 acquires data using the wireless communication 204 from, out of the field devices 202 managed by the data management block 213, the field devices 202 provided in the plant area selected by user operation (Step S305, Step S321, Step S322). Even with such a mobile device 201, as has been described so far, it is possible to acquire the data of the field devices 202 efficiently.

The information processing method, which has been described with reference to FIG. 1 to FIG. 10 and others, also is one of the embodiments. The information processing method includes managing, by the mobile device 201, a number of field devices 202 (field device 202a to field device 202d, field device #1 to field device #N, and the like) grouped for each plant area (plant area 311a to plant area 311c, and so on) (Step S303) and acquiring, by the mobile device 201, data using the wireless communication 204 from, out of the field devices 202 managed, the field devices 202 provided in the plant area selected by user operation (Step S305, Step S321, Step S322). Even with such an information processing method, as has been described so far, it is possible to acquire the data of the field devices 202 efficiently.

The information processing program, which has been described with reference to FIG. 1 to FIG. 11 and others, also is one of the embodiments. The information processing program causes a computer to perform a process of managing a number of field devices 202 (field device 202a to field device 202d, field device #1 to field device #N, and the like) grouped for each plant area (plant area 311a to plant area 311c, and so on) (Step S303) and acquiring data using the wireless communication 204 from, out of the field devices 202 managed, the field devices provided in the plant area selected by user operation (Step S305, Step S321, Step S322). Even with such an information processing program, as has been described so far, it is possible to acquire the data of the field devices 202 efficiently. As has been described with reference to FIG. 11 and others, the recording medium on which the information processing program is recorded also is one of the embodiment.

What is claimed is:

1. An information processing system comprising:
    a number of field devices provided in a plant; and
    a mobile device configured to acquire data from the field devices, wherein
    the mobile device includes
        a data management unit configured to manage the field devices by using a list indicating the field devices that are grouped for each plant area, and
        a processing unit configured to sequentially acquire data using wireless communication from, out of the field devices managed in the list, the field device for which a connection is successful from among the field devices provided in the plant area selected by user operation.

2. The information processing system according to claim 1, wherein
    the processing unit acquires data using wireless communication from the field device selected by user operation, out of the field devices indicated in an image of the plant area selected by the user operation; and
    the data management unit selects one of the list-based sequential access management using the list and the image-based access management using the image according to the user operation.

3. The information processing system according to claim 2, wherein the processing unit stops to acquire data from the field device for which the connection failed, and skips to a next field device in the list to acquire data.

4. The information processing system according claim 1, wherein the processing unit generates at least one of a file including acquired data and a report document, used to report the acquired data.

5. The information processing system according to claim 1, further comprising an app management unit configured to manage an application installed in the mobile device to check credential information of user's authority that allows at least a part of processing of the processing unit based on the user operation to be executed.

6. The information processing system according claim 1, wherein the processing unit edits a parameter of the field device.

7. The information processing system according to claim 1, wherein the processing unit generates log information concerning acquisition of data from the field device.

8. The information processing system according to claim 1, wherein the processing unit acquires information stored in the mobile device or information from outside of the mobile device as support information to support maintenance work of the field device performed by a user.

9. The information processing system according to claim 1, wherein the field devices are, in order to transmit the data, connected in a wired manner to a radio that performs wireless communication with the mobile device.

10. The information processing system according to claim 1, wherein
the processing unit sequentially tries to connect to all of the field devices in the list to acquire data.

11. The information processing system according to claim 1, wherein the processing unit stops to acquire data from the field device for which the connection failed, and skips to a next field device in the list to acquire data.

12. An information processing method comprising:
managing, by a mobile device, a number of field devices by using a list indicating the field devices that are grouped for each plant area; and
sequentially acquiring, by the mobile device, data using wireless communication from, out of the field devices managed in the list, the field device for which a connection is successful from among the field devices provided in the plant area selected by user operation.

13. A mobile device comprising:
a data management unit configured to manage a number of field devices by using a list indicating the field devices that are grouped for each plant area, each of the field devices being configured to allow direct wireless communication with the mobile device; and
a processing unit configured to sequentially acquire data using wireless communication from, out of the field devices managed in the list, the field device for which a connection is successful from among the field devices provided in the plant area selected by user operation.

14. A computer-readable recording medium having stored therein an information processing program that causes a computer to perform a process comprising:
managing a number of field devices by using a list indicating the field devices that are grouped for each plant area; and
sequentially acquiring data using wireless communication from, out of the field devices managed in the list, the field device for which a connection is successful from among the field devices provided in the plant area selected by user operation.

* * * * *